(12) United States Patent
Liang et al.

(10) Patent No.: US 8,707,417 B1
(45) Date of Patent: Apr. 22, 2014

(54) DRIVER DOMAIN AS SECURITY MONITOR IN VIRTUALIZATION ENVIRONMENT

(75) Inventors: Po-Cheng Liang, New Taipei (TW); Kun-Shan Lin, Taipei (TW); Chien-Ta Chu, New Taipei (TW)

(73) Assignee: Trend Micro, Inc., Tokyo (JP)

( * ) Notice: Subject to any disclaimer, the term of this patent is extended or adjusted under 35 U.S.C. 154(b) by 33 days.

(21) Appl. No.: 13/396,516

(22) Filed: Feb. 14, 2012

(51) Int. Cl.
*G06F 21/00* (2013.01)
*G06F 21/53* (2013.01)
*G06F 21/56* (2013.01)
*H04L 29/06* (2006.01)

(52) U.S. Cl.
CPC ............... *G06F 21/53* (2013.01); *G06F 21/56* (2013.01); *H04L 63/0263* (2013.01)
USPC .............................................. 726/11; 726/22

(58) Field of Classification Search
CPC . H04L 63/0263; H04L 63/0227; H04L 63/02; H04L 63/029; H04L 63/0209; G06F 21/53; G06F 21/56
See application file for complete search history.

(56) References Cited

U.S. PATENT DOCUMENTS

2009/0073895 A1* 3/2009 Morgan et al. ................ 370/255
2009/0172818 A1* 7/2009 Sutherland et al. ............. 726/25
2009/0254990 A1* 10/2009 McGee ........................... 726/22
2010/0138840 A1* 6/2010 Kagan et al. .................. 718/104
2012/0284712 A1* 11/2012 Nimmagadda et al. ........... 718/1
2013/0036470 A1* 2/2013 Zhu et al. ........................ 726/23

OTHER PUBLICATIONS

Shin et al., "The new approach for inter-communication between guest domains on Virtual Machine Monitor", Nov. 2007, IEEE, iscis 2007, 22nd international symposium, 6 pages.*
Szefer et al., "Eliminating the Hypervisor Attack Surface for a More Secure Cloud", Oct. 2011, CCS'11, 12 pages.*
Keller et al., "NoHype: Virtualized Cloud Infrastructure without the Virtualization", Jun. 2010, ISCA'10, 12 pages.*
Jin et al., "Virtual Switching Without a Hypervisor for a More Secure Cloud", Apr. 2012, USENIX work shop, 6 pages.*

* cited by examiner

*Primary Examiner* — Lisa Lewis
*Assistant Examiner* — Maung Lwin
(74) *Attorney, Agent, or Firm* — Beyer Law Group LLP

(57) ABSTRACT

A virtualization platform includes a number of virtual machines, one of which is configured as a driver domain and includes the network service control for routing network traffic between the other virtual machines. The privileged domain does not include the network service control. The network service control includes network backend interfaces and a virtual switch or bridge. The driver domain includes a PCI driver for direct communication with a network interface card. The driver domain includes hooking software and an inspection agent. Packets passing between the other virtual machines pass through the driver domain, are hooked, and are inspected by inspection agent to determine if they are malicious or not. Malicious packets are blocked. The driver domain may also utilize a PCI driver of the privileged domain for access to the network interface card. Platforms with or without pass-through mode may be used.

30 Claims, 9 Drawing Sheets

Adoption of Driver Domain

DRIVER DOMAIN AS SECURITY MONITOR IN VIRTUALIZATION ENVIRONMENT

FIELD OF THE INVENTION

The present invention relates generally to the detection of malicious software on a computer. More specifically, the present invention relates to detection of malicious software between virtual machines in a virtualization environment.

BACKGROUND OF THE INVENTION

While malicious software certainly targets traditional computers running a single operating system, it can also target a computer running multiple operating systems. In a virtualization environment, different operating systems may run on a single computer and these may be subject to unique types of malicious software.

FIG. 1 illustrates a prior art virtualization environment 10 that is subject to attacks by malicious software. Any suitable computer hardware 20 executes a virtualization platform 30 which is a layer of software running directly on the computer hardware and which replaces the traditional operating system. The platform 30 allows the computer hardware to execute multiple operating systems concurrently such as a Microsoft operating system 50, a Linux operating system 60, Solaris, NetBSD, FreeBSD, and others. The privileged domain 40 may execute under any of a variety of operating systems as well. Each operating system 40-60 then may execute independently of the others and therefore each is considered a virtual machine (VM).

Unfortunately, the nature of a virtualization environment allows for a new threat called an inter-VM attack, in which malicious software under one operating system attacks programs and data under another operating system executing on the same host computer. An attack can also take place between virtual machines—from one host computer to another host computer.

Inter-VM attacks can be especially problematic in a public virtual cloud environment. Traditional network security software not accustomed to a virtualization environment has difficulty detecting or containing malicious inter-VM traffic between the virtual machines. More and more, a great deal of data center network traffic occurs between virtual machines on a host computer server, but, administrators find it more and more difficult to monitor such virtual machine traffic or to implement inspection or filtering policies. Such traffic between virtual machines might be invisible to traditional network monitoring tools such as packet inspection or filtering because such traffic does not use the physical network.

While one approach might be to scale back any virtualization efforts, this defeats the promise that virtualization offers in terms of economic benefits. Physical security products cannot detect attacks that go from one virtual machine to another on the same host computer. And, attempting to send all inter-VM traffic out to the network in order to detect these inter-VM attacks is undesirable because it increases network latency. Another approach might be to install security software on each virtual machine; but, this consumes resources on each machine and the need to manage the security software of each virtual machine. Installing security software in the host system is a possibility but this technique might not be portable between diverse host systems.

Accordingly, new techniques are desired to address inter-VM attacks and other malicious software within a virtualization environment.

SUMMARY OF THE INVENTION

To achieve the foregoing, and in accordance with the purpose of the present invention, a driver domain of a virtualization environment is disclosed that functions as a security monitor. In the context of network security, the present invention allows a driver domain to be used for security and moves network service control from the privileged domain to the driver domain. In this way, the driver domain can monitor the network traffic itself without needing any extra relay mechanism. One advantage is that security development can focus on a single guest domain of the virtualization environment.

Further, performance in this virtualization environment is similar to hooking and processing packets within the privileged domain, at no additional redirection is needed between the privileged domain and the driver domain. The architecture is simple and no inter-VM communication is needed to share packets.

In a first embodiment, a virtualization platform includes a plurality of virtual machines. One of the virtual machines is configured as a driver domain and will include the network service control for routing network traffic between the other virtual machines of the platform. The privileged domain (i.e., "domain 0") is not used to include the network service control. The network service control includes network backend interfaces for communicating with the other virtual machines and a virtual switch. Packets passing between the other virtual machines must necessarily pass through the virtual switch of the driver domain and may be inspected by inspection agent software to determine if they are malicious or not. The driver domain includes a PCI driver for direct communication with a network interface card.

In a second embodiment, a virtualization platform includes a plurality of virtual machines. One of the virtual machines is configured as a driver domain and will include the network service control for routing network traffic between the other virtual machines of the platform. The privileged domain (i.e., "domain 0") is not used to include the network service control. The network service control includes network backend interfaces for communicating with the other virtual machines and a virtual switch. Packets passing between the other virtual machines must necessarily pass through the virtual switch of the driver domain and may be inspected by inspection agent software to determine if they are malicious or not. The driver domain includes a network front end for communication with the privileged domain which also includes a switch and a PCI driver for direct communication with a network interface card.

In a third embodiment, a virtualization platform includes a plurality of virtual machines. One of the virtual machines is configured as a driver domain and includes a virtual switch. The driver domain is granted access by the platform to directly access a hardware device such as a network interface card. The privileged domain of the virtualization platform does not include the network service control. Packet hooking software and inspection agent software are added to the driver domain for inspecting packets as they pass between virtual machines of the platform.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
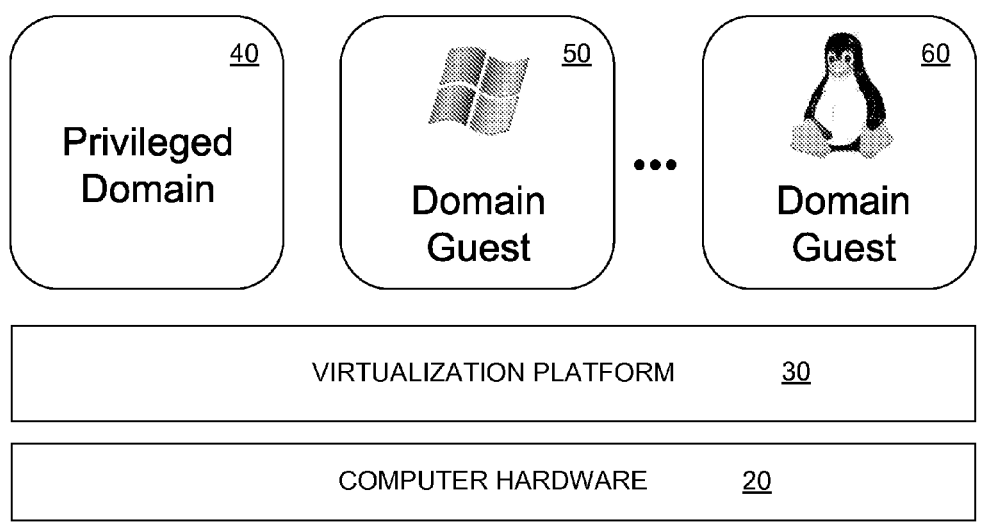
FIG. 1 illustrates a prior art virtualization environment that is subject to attacks by malicious software.

Referring again to FIG. 1, a virtualization platform 30, also known as a hypervisor, executes upon a computer processor such as an x86, x86-64, Itanium, Power PC, ARM, or other. In one particular embodiment, the virtualization platform 30 is the Xen hypervisor available from Citrix Systems, Inc. Other suitable virtualization platforms that may benefit from the present invention are the ESXI and vSphere hypervisors available from VMWARE, the Hyper V Server hypervisor available from Microsoft Corporation, and the KVM hypervisor available from LINUX. While the below discussion uses the Xen hypervisor as an example, one of skill in the art will understand that the present invention is suitable for use with a variety of virtualization platforms.

The virtualization platform 30 runs directly on the hardware 20 and becomes the interface for all hardware requests such as CPU, I/O, and disk for the various operating systems executing upon it. By separating the guest operating systems from the computer hardware, the hypervisor is able to run multiple operating systems securely and independently. The privileged domain 40 (or, Domain 0) is a privileged guest operating system executing within the hypervisor which has direct hardware access and other guest management responsibilities. Typically, the privileged domain can run most any operating system and has unique privileges allowing it to manage all aspects of the other domain guests such as starting, stopping, and I/O requests. The domain guests (e.g., operating systems 50 and 60) are unprivileged domains that are launched and controlled by the privileged domain and operate independently within the hypervisor. These domain guests are typically referred to as hardware virtual machines and are generally unaware that each is not running directly on the computer hardware.

Typically, network traffic between guest domains (such as between virtual machine 50 and virtual machine 60) must pass through the network service control of privileged domain 40 in order for the two guest domains to talk to one another. If adequate security is not available or enforced by the privileged domain, then one malicious guest domain may be able to launch an attack against another domain.

Figure 2:
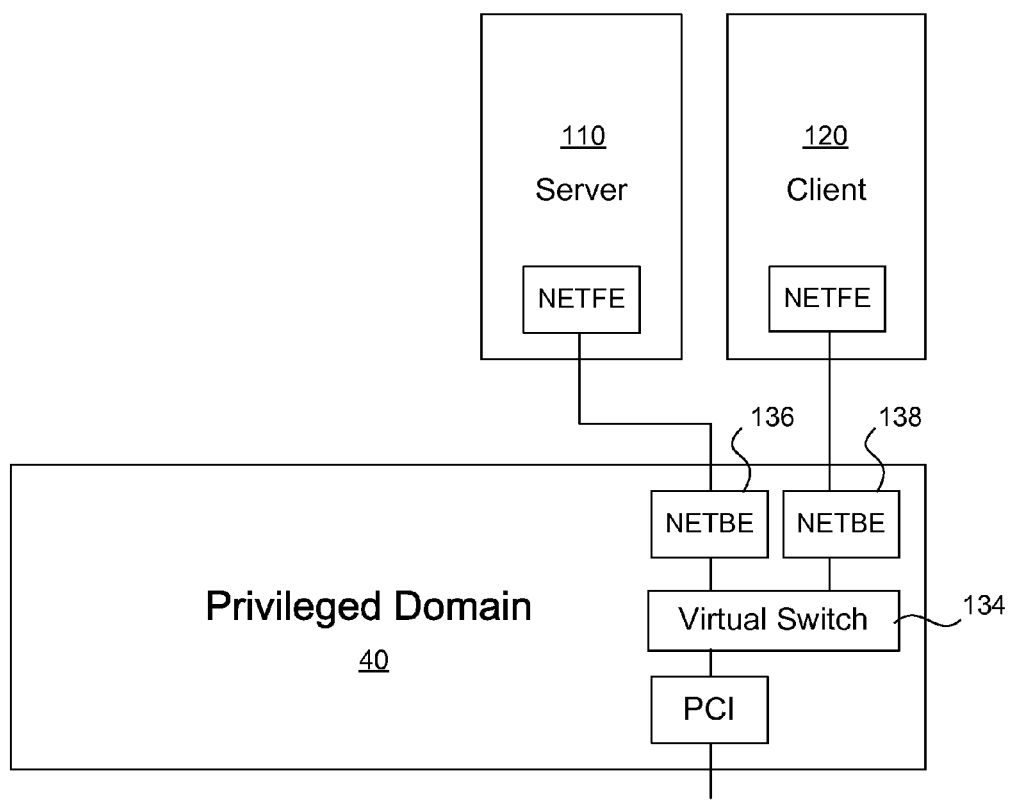
FIG. 2 illustrates a more detailed example of a prior art virtualization environment.

FIG. 2 illustrates a more detailed example of a prior art virtualization environment. This environment illustrates how two virtual machines, namely server 110 and client 120, communicate with one another using the platform 30 (not shown) and the privileged domain 40. In one embodiment in which the virtualization platform 30 is the Xen hypervisor, the privileged domain (running Debian 6.0) includes network back end drivers 136 and 138 while the server and client include corresponding network front end drivers 112 and 122. Other implementations may use other similar interfaces such as the VMWare Tools interfaces used by the VMWare platform. These network drivers generally provide better input and output. The privileged domain also includes a virtual switch 134 (implemented in the Linux kernel when the Xen hypervisor is used) and a PCI driver 132 used for communicating with a hardware PCI device such as a network interface card. Collectively, drivers 136, 138 and virtual switch 134 are referred to as the network service control. Typically, the privileged domain includes 132, 134, 136, and 138, while the virtualization platform includes the virtual machine manager (VMM), a hardware controller, and virtualized hardware resources.

As shown, all network traffic between client and server must pass through the privileged domain in order to access the network interface card. While this traditional approach can work, it is desirable to intercept network traffic using an improved technique.

Block Diagrams

Figure 3:
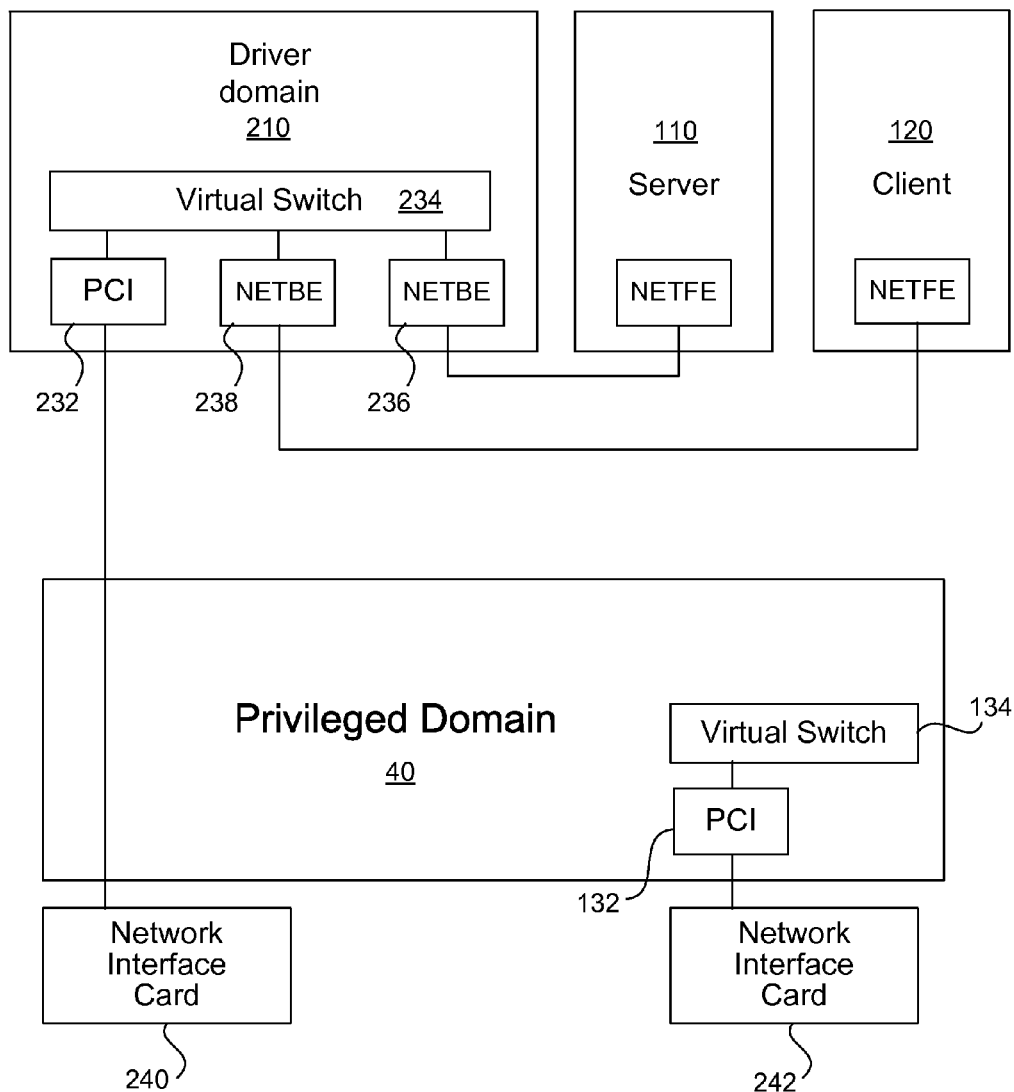
FIG. 3 is a block diagram of one embodiment of the present invention.

FIG. 3 is a block diagram of one embodiment of the present invention. The privileged domain 40, server 110 and client 120 are still present in this embodiment, while a new virtual machine, driver domain 210, has been introduced. Virtual machine 210 is termed a "driver domain" as virtual machine 210 manages the physical network interface card by using its related hardware driver and also by using the backend drivers for the device service (e.g., the network service).

As shown, the functionality of the network service control 134-138 has been moved from the privileged domain into a new driver domain 210 and has been implemented using virtual switch 234, network backend 236 and network backend 238. Additionally, the PCI driver 232 has been moved into the driver domain thus allowing the driver domain to communicate directly with a hardware device such as a network interface card 240.

Optionally, virtual switch 134 and PCI driver 132 may be retained within the privileged domain if necessary for the privileged domain to communicate with the outside world. If so, then a second network interface card 242 will be needed for the privilege domain to communicate. More specifically, the privileged domain 40 (domain 0) uses a separate physical NIC 242 on a separate management port. Communication on this port is secure and this management network will not be interfered with by inter-VM traffic using card 240. In particular, in the case that there is malicious traffic on the inter-VM network or the inter-VM network is too busy, the management network can operate without interference. If this management network is not necessary, then switch 134, driver 132 and card 242 may be omitted.

Figure 8:
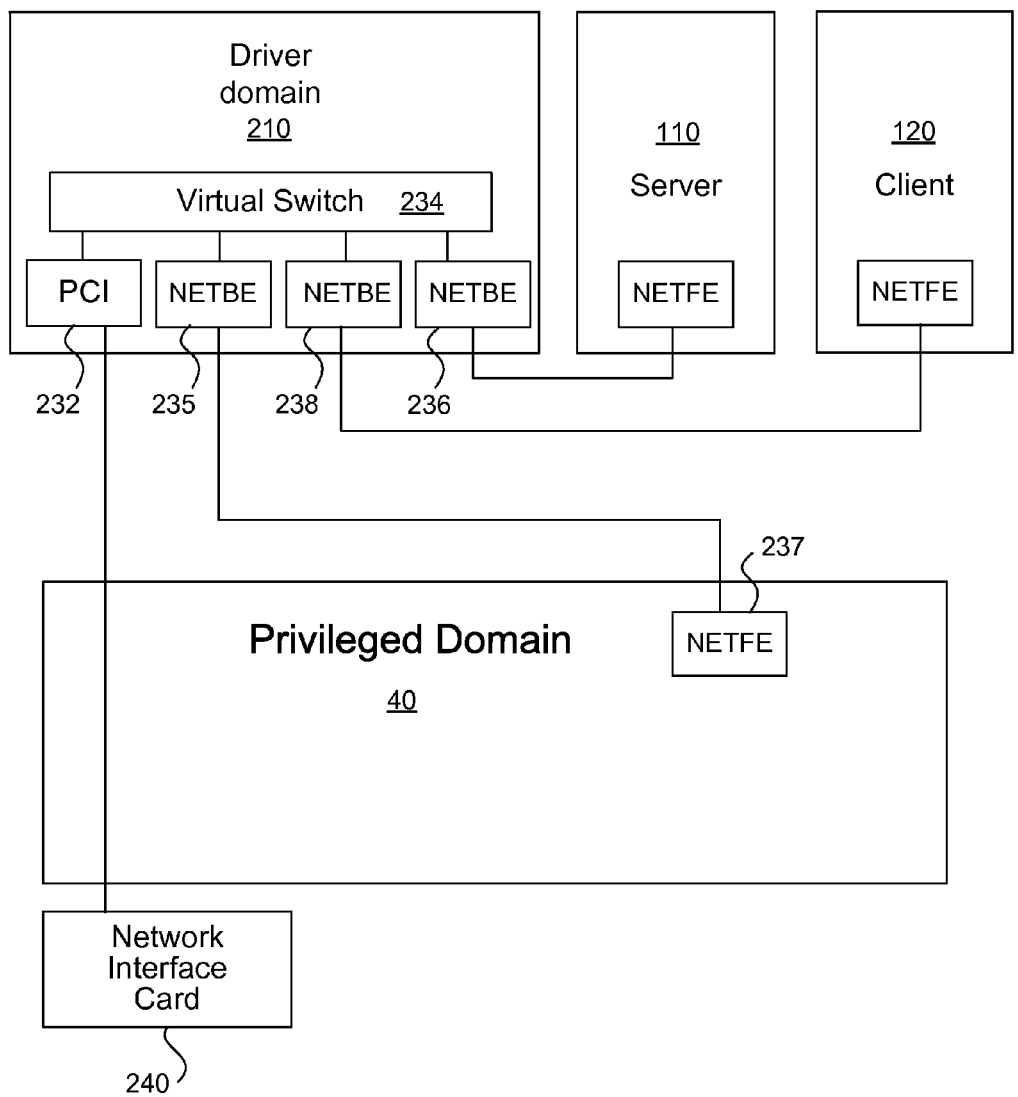
FIG. 8 is a block diagram of another embodiment of the present invention.

FIG. 8 illustrates this situation in which the management network is not needed. Similar to FIG. 3, FIG. 8 includes the driver domain, server, client, and privileged domain, except that switch 134, PCI 132 and card 242 have been omitted. Also, drivers 235 and 237 have been added so that the privileged domain may communicate using card 240. The workings of FIG. 8 will be understood by the below explanation of FIG. 3.

In the embodiment of FIG. 3, a hardware device such as card 240 will be owned and controlled by the driver domain 210 rather than by the privileged domain. In other words, a dedicated network device, such as the network interface card is assigned to the driver domain. Thus, any network communication between client and server must pass through the driver domain 210, may be intercepted, perhaps filtered or blocked, or have any other operation performed upon the network packets. In contrast with the prior art in which the backend drivers, switch and hardware drivers are located within the privileged domain, these modules may now all be located within the driver domain 210.

Driver domain 210 may be any unprivileged guest domain that has been granted access to a particular piece of hardware, such as the network interface card. The driver domain will typically run an operating system kernel including the backend drivers and the device driver for the particular device class. Although communication from the PCI driver 232 may utilize the virtualization platform for communication with the network interface card, the platform implements a pass-through mode in which the communication is not directly handled by the platform. Different Linux distributions with para-virtualization support (backend drivers, hotplug scripts, and pass-through hardware drivers) can be executed on the driver domain. The benefits of using these distributions are performance, security, and supported drivers of specific distributions. If other operating systems are used, it is preferable to have this para-virtualization support (backend drivers, hotplug scripts, and pass-through hardware drivers).

Figure 4:
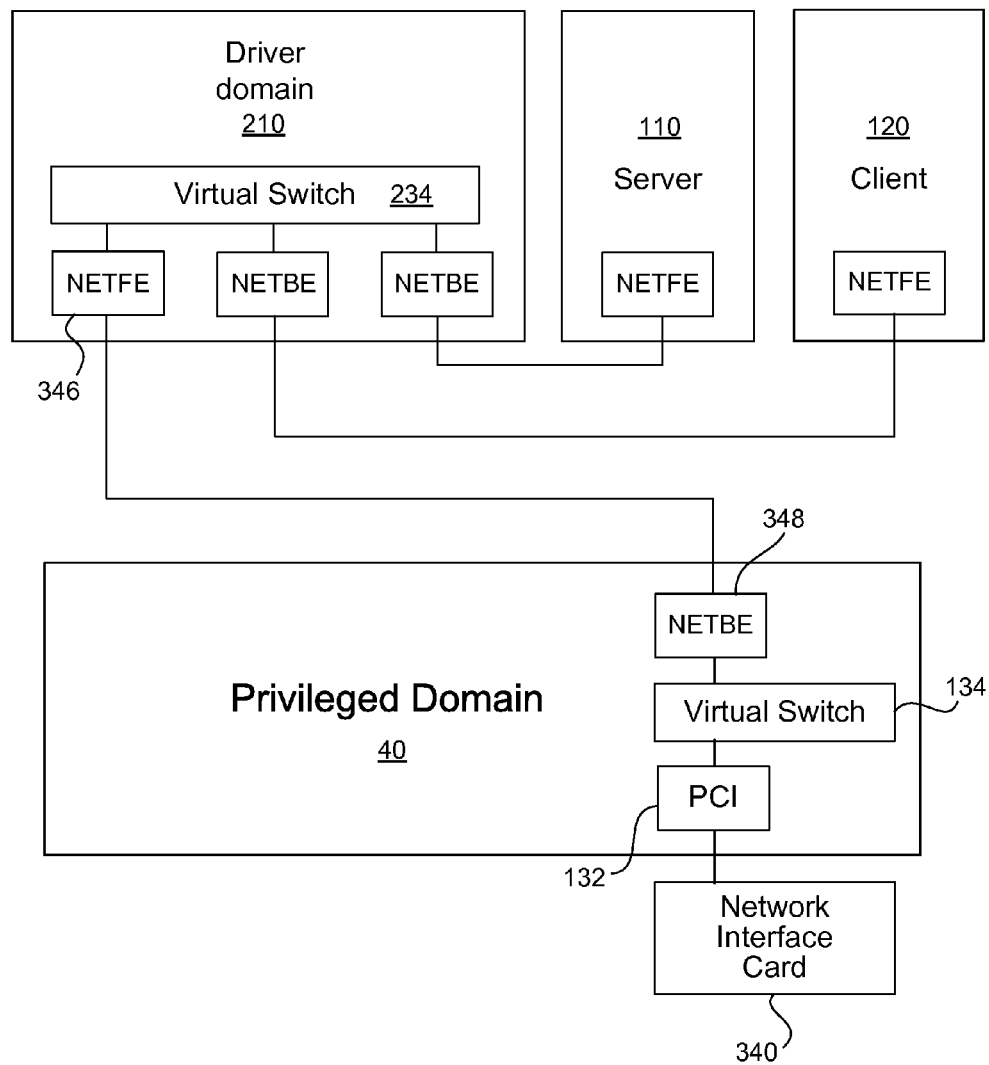
FIG. 4 is a block diagram of a second embodiment of the present invention.

FIG. 4 is a block diagram of a second embodiment of the present invention. The privileged domain 40, server 110 and client 120 are still present in this embodiment, while a new virtual machine, driver domain 210, has been introduced. As shown, the functionality of the network service control 134-138 has been moved from the privileged domain into a new driver domain 210 and has been implemented using virtual switch 234, network backend 236 and network backend 238. But, the PCI driver 132 and the virtual switch 134 have been retained within the privileged domain, thus allowing the driver domain to communicate with a hardware device such as a network interface card 340 via the privileged domain. A network backend 348 is added to the privileged domain and a network front end 346 is added to the driver to domain so that they may communicate with one another.

In this embodiment, a hardware device such as card 340 will be owned and controlled by the privileged domain 40 rather than by the driver domain. In other words, a dedicated network device, such as the network interface card is assigned to the privileged domain. Thus, any network communication between client and server must still pass through the driver domain 210, may be intercepted, perhaps filtered or blocked, or have any other operation performed upon the network packets. In contrast with the prior art in which network communication between virtual machines does not pass through a driver domain, network packets in this embodiment still pass through the driver domain.

Driver domain 210 may be any unprivileged guest domain. The driver domain will typically run an operating system kernel including the backend drivers. In this embodiment, a pass-through mode is not used, which is useful for those hypervisors or virtualization platforms that do not implement a pass-through mode. In addition, this embodiment allows a single network interface card to perform network communications for any number of guest domains as well as for the privileged domains.

Flow Diagrams

Figure 5:
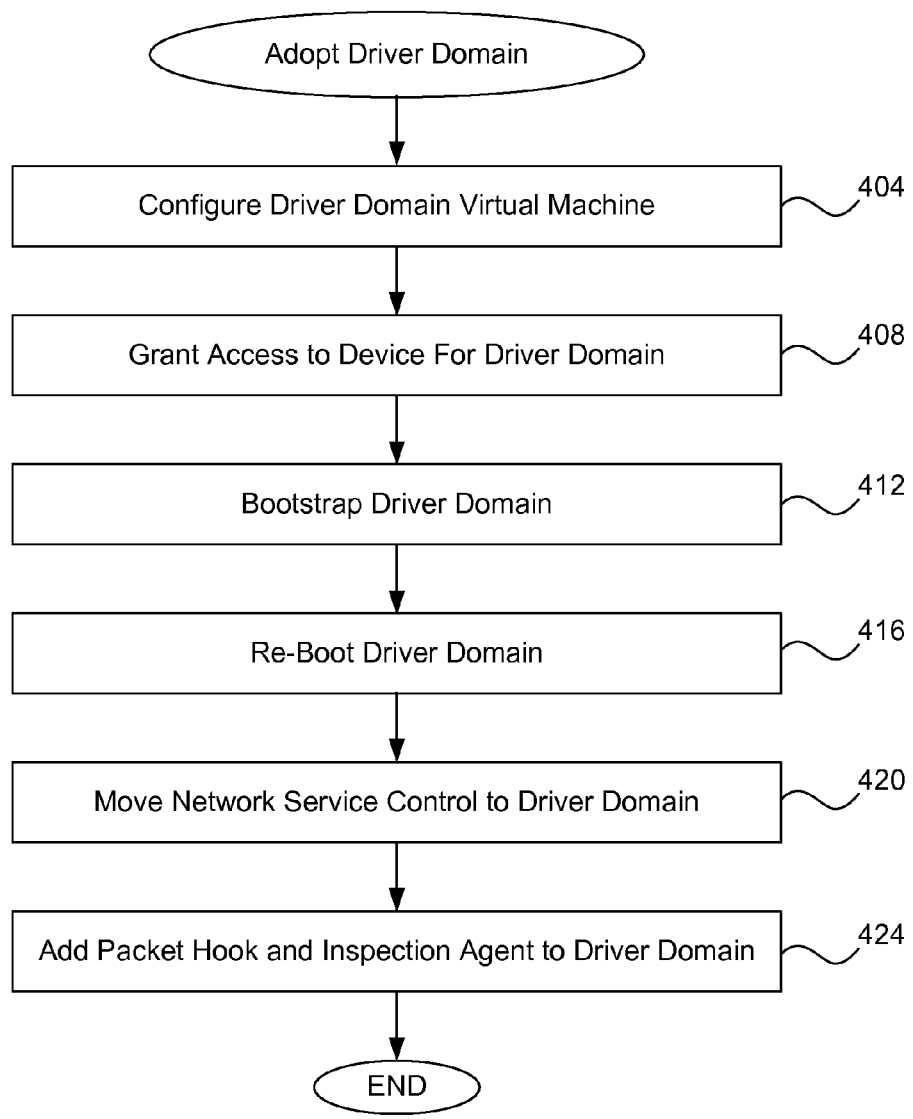
FIG. 5 is a flow diagram illustrating one embodiment by which a driver domain is adopted for use within a virtualization environment.

FIG. 5 is a flow diagram illustrating one embodiment by which a driver domain is adopted for use within a virtualization environment. Adopting and using a driver domain virtual machine in order to inspect network packets is useful for detecting malicious software. In step 404 a virtual machine is added to the virtualization platform and configured as a driver domain. Adding a virtual machine is known to those of skill in the art. To configure the new virtual machine for use as a driver domain certain software requirements are met. The driver domain will need backend network drivers in order to communicate with any number of other virtual machines on the platform, will need virtual switch software (such as a software bridge), and will need hotplug scripts or similar (which are used for connecting a virtual machines' backend driver with the virtual switch_). In addition, if the embodiment of FIG. 3 is implemented, then the driver domain will need a PCI driver which allows it to communicate directly with a hardware device in pass-through mode. If the embodiment of FIG. 4 is implemented, then the driver domain will also need a front end network driver in order to communicate with the back end of the privileged domain. In step 408 the driver domain is granted access to a physical hardware device if the domain will be communicating with the device in pass-through mode.

In step 412 the driver domain is bootstrapped and configured. In this step any required software packages are updated or prepared, and any editing of network software is performed. For example, "/etc/network/interface" may be edited to add any virtual NIC and virtual switch settings. Also, any necessary hypervisor tools are added at this time to the driver domain. For example, in the embodiment in which the Xen hypervisor is used, the Xen 4.0.1 tools are added. In step 416 the driver domain is rebooted in order to adopt the recent settings.

In step 420 the network service control is moved from the privileged domain to the driver domain. This step may be performed on each regular virtual machine (that is, each virtual machine other than the driver domain) by modifying the vif setting in each virtual machine's configuration file as follows: vif=["mac=XX:XX:XX:XX:XX:XX, backend=driver_domain_name"].

In step 424 packets hooking software and an inspection agent are added to the driver domain. Preferably, a netfilter hook may be added to the virtual switch which will hook each packet and send it to the inspection agent for a decision. The inspection agent is preferably a software module added to the driver domain which is under the control of an antivirus service provider. The hook is any suitable software arranged to filter packets in a network communication and to pass each packet to the inspection agent. Each packet may be hooked and delayed until an inspection decision has been made, or packets may be copied and sent to the inspection agent while allowing the original packet to pass through the virtual switch. The inspection agent may use any criteria to determine whether or not a packet or series of packets is malicious. If so, the inspection agent may filter the packets, may block certain packets, may raise an alert, may terminate the communication between the sending and receiving virtual machines, or may perform any other necessary action.

Once the driver domain has been adopted and configured within the virtualization environments, is ready to begin inspecting network packets in a communication between virtual machines.

Figure 6:
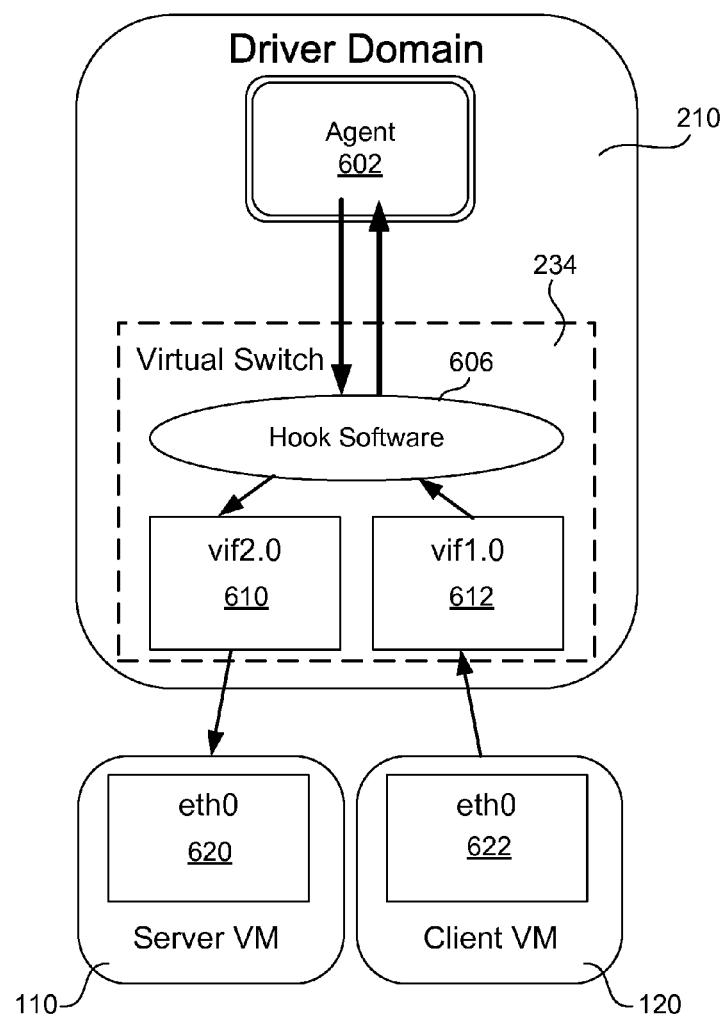
FIG. 6 is a block diagram showing the network traffic flow within the driver domain.

FIG. 6 is a block diagram showing the network traffic flow within the driver domain. As shown, the driver domain virtual machine 210 is in communication with server 110 and client 120 in the context of a communication between the client and server. The driver domain includes inspection agent software 602 and virtual switch 234. Included within the virtual switch is specialized hook software 606 arranged to hook each packet as it comes through the switch and for the packets to the agent. In this specific embodiment, virtual Ethernet interface 612 and 622 is used for communication between the client and the driver domain and virtual Ethernet interface 610 at 620 is used for the server.

Figure 7:
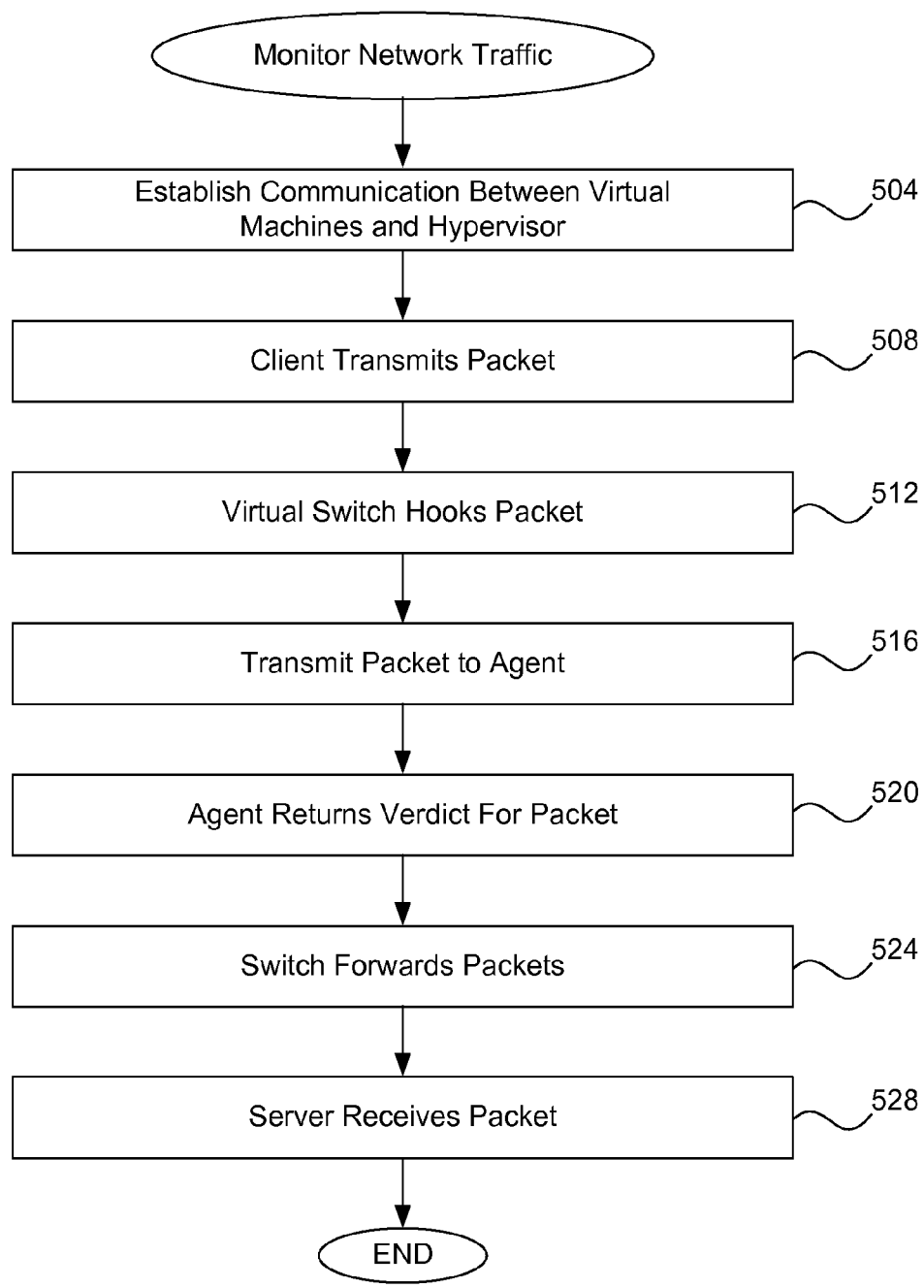
FIG. 7 is a flow diagram describing an embodiment for monitoring network traffic within a virtualization environment.

FIG. 7 is a flow diagram describing an embodiment for monitoring network traffic within a virtualization environment. In step 504 communication is established between any number of virtual machines (including a driver domain) and a hypervisor in a virtualization environment such as has been explained earlier. The driver domain is adopted into the environment as explained in FIG. 5. In step 508 the client virtual machine 120 begins communication with server virtual machine 110 and transmits a packet via its interface to the virtual switch of the driver domain. In step 512 the virtual switch hooks the packets using any of a variety of techniques. The switch may route every packet to the agent (in-line processing) or may simply copy each packet and allow the original packet to continue on. Rules in the hook software that may be configured to determine whether packets are routed or copied. Software 606 is termed "hook software" in that normally the packets would not be stopped and routed to the agent; they would simply continue through the switch without inspection.

In step 516 the virtual switch transmits the packet to inspection agent 602 for inspection. Agent 602 is a software module arranged to determine whether or not a packet or series of packets are malicious. The agent may check the header of a packet or other characteristics such as by checking the traffic type against the firewall policy_in order to determine if a packet is part of a malicious attack. If not, the packet is allowed to continue on its way. If so, the agent may block the packet, delay the packet, raise an alert, etc. Again, rules may be used within the agent to determine how to handle benign or malicious packets. Once the agent has inspected the packet, in step 520 the agent returned the verdict for the packet to the virtual switch. If positive, the original packet is allowed to continue on its way, or, if the packet had been copied, no action need be taken. If negative, the packet may be blocked at this point or other action may be taken.

In step 524, assuming that the verdict was positive, the virtual switch forwards the packet to its virtual interface 610. In step 528 the server receives the packet at its virtual interface and takes appropriate action. In this manner, virtual machines may communicate with one another yet all the packets can be inspected by an inspection agent within the driver domain. Whether or not the embodiment of FIG. 3 or FIG. 4 is used, the virtual switch of the driver domain will still see all of the network packets.

Computer System Embodiment

Figure 9A:
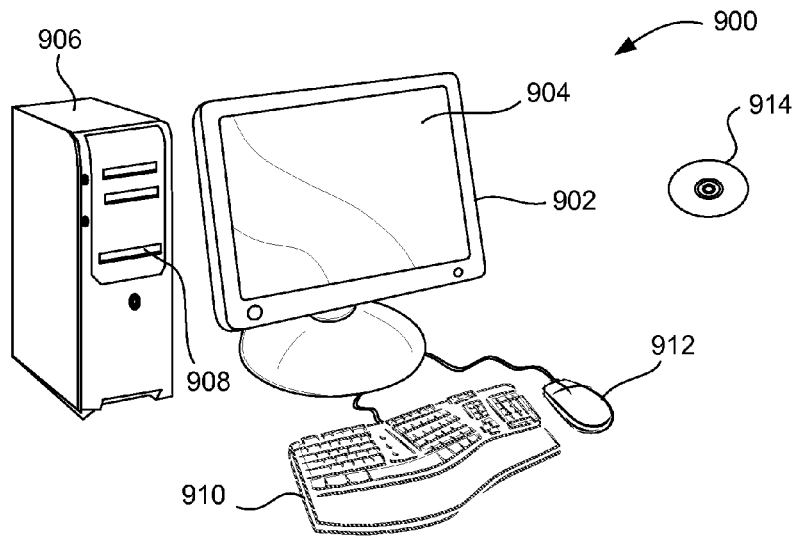
FIGS. 9A and 9B illustrate a computer system suitable for implementing embodiments of the present invention.
Figure 9B:
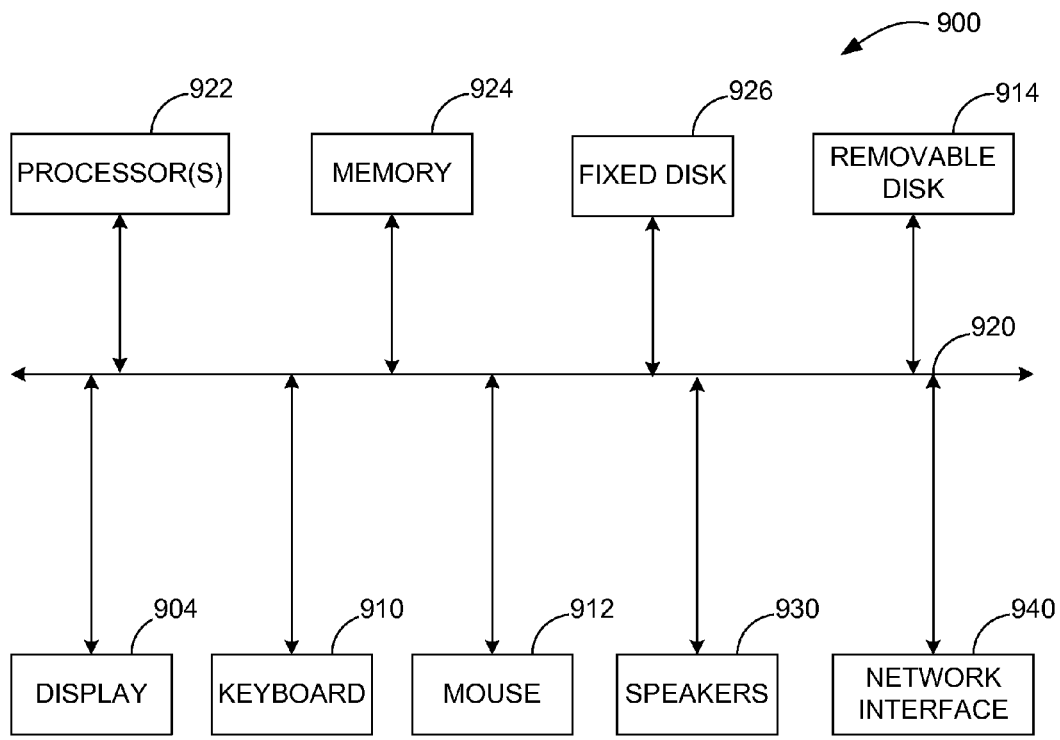

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of monitoring network traffic on a virtualization platform that includes a privileged domain that manages virtual machines on said virtualization platform, said method comprising:

sending a packet from a server virtual machine on said virtualization platform to a driver virtual machine on said virtualization platform, said driver virtual machine not being said privileged domain of said virtualization platform and including a virtual switch for handling communication between said virtual machines;

hooking said packet on said driver virtual machine and sending said packet to inspection software on said driver virtual machine;

inspecting said packet within said inspection software and determining whether said packet is malicious or not; and allowing said packet to continue from said driver virtual machine to a client virtual machine on said virtualization platform.

2. The method as recited in claim 1 wherein said driver virtual machine includes a PCI driver for direct communication with a hardware network controller, said method further comprising:

accessing said hardware network controller by said driver virtual machine to facilitate allowing said packet to continue to said client virtual machine.

3. The method as recited in claim 1 wherein said privileged domain of said virtualization platform includes a PCI driver for direct communication with a hardware network controller, said method further comprising:

accessing said hardware network controller by said driver virtual machine via said privileged domain to facilitate allowing said packet to continue to said client virtual machine.

4. The method as recited in claim 1 further comprising:

passing said packet through said virtual switch on the way from said server virtual machine to said client virtual machine.

5. The method as recited in claim 2 wherein said hardware network controller is owned by said driver virtual machine.

6. The method as recited in claim 1 further comprising:

allowing said packet continue to said client virtual machine from said server virtual machine by implementing a pass-through mode of said virtualization platform.

7. The method as recited in claim 3 wherein said virtualization platform does not include a pass-through mode.

8. A method of monitoring network traffic on a virtualization platform that includes a privileged domain that manages virtual machines on said virtualization platform, said method comprising:

sending, from a client virtual machine on said virtualization platform to a server virtual machine on said virtualization platform, a plurality of network packets;

receiving said packets at a switch within a driver virtual machine, said driver virtual machine not being said privileged domain of said virtualization platform;

inspecting at least some of said packets within said driver virtual machine;

rendering a decision regarding said at least some of said packets; and allowing a portion of said at least some of said packets continue on to said server virtual machine based upon said decision.

9. The method as recited in claim 8 wherein said driver virtual machine includes a PCI driver for direct communication with a hardware network controller, said method further comprising:

accessing said hardware network controller by said driver virtual machine to facilitate allowing said portion of said packets to continue to said server virtual machine.

10. The method as recited in claim 8 wherein said privileged domain of said virtualization platform includes a PCI driver for direct communication with a hardware network controller, said method further comprising:

accessing said hardware network controller by said driver virtual machine via said privileged domain to facilitate allowing said portion of said packets to continue to said server virtual machine.

11. The method as recited in claim 8 wherein said driver virtual machine includes an inspection agent for inspecting said packets, said method further comprising:

inspecting said packets using said inspection agent and rendering said decision using said inspection agent.

12. The method as recited in claim 9 wherein said hardware network controller is owned by said driver virtual machine.

13. The method as recited in claim 8 further comprising:

allowing said portion of said packets continue to said server virtual machine from said client virtual machine by implementing a pass-through mode of said virtualization platform.

14. The method as recited in claim 10 wherein said virtualization platform does not include a pass-through mode.

15. A method of monitoring network traffic within a hardware virtualization on a host computer that includes a privileged domain that manages virtual machines on said hardware virtualization, said method comprising:

configuring a first virtual machine of said hardware virtualization as a driver domain, said driver domain not being said privileged domain and including a virtual switch for handling communication between said virtual machines;

granting access to said driver domain to access a network hardware device of said host computer in a pass-through mode;

receiving a network packet from a second virtual machine of said hardware virtualization at said driver domain;

accessing said network hardware device directly by said driver domain in order to route said packet; and sending said packet from said driver domain to a third virtual machine of said hardware virtualization.

16. The method as recited in claim 15 wherein said driver domain includes a PCI driver for direct communication with said network hardware device.

17. The method as recited in claim 15 further comprising:

passing said network packet through said virtual switch on the way from said second virtual machine to said third virtual machine.

18. The method as recited in claim 15 wherein said network hardware device is owned by said driver domain.

19. The method as recited in claim 15 further comprising:

inspecting said packet within said driver domain and determining that said packet is malicious; and raising alert indicating that said packet is malicious.

20. The method as recited in claim 15 further comprising:

inspecting said packet within said driver domain and determining that said packet is benign.

21. The method as recited in claim 1 wherein said driver virtual machine further includes backend network drivers for communicating with said virtual machines.

22. The method as recited in claim 1 wherein said driver virtual machine further includes a network service control of said virtualization platform.

23. The method as recited in claim 1 further comprising:

changing a setting in each of said virtual machines other than said driver virtual machine to indicate that the backend is said driver virtual machine.

24. The method as recited in claim 8 wherein said switch is a virtual switch for handling communication between said virtual machines.

25. The method as recited in claim 24 wherein said driver virtual machine further includes backend network drivers for communicating with said virtual machines.

26. The method as recited in claim 24 wherein said driver virtual machine further includes a network service control of said virtualization platform.

27. The method as recited in claim 8 further comprising:
changing a setting in each of said virtual machines other than said driver virtual machine to indicate that the backend is said driver virtual machine.

28. The method as recited in claim 15 wherein said driver domain further includes backend network drivers for communicating with said virtual machines.

29. The method as recited in claim 15 wherein said driver domain further includes a network service control of said virtualization platform.

30. The method as recited in claim 15 further comprising:
changing a setting in each of said virtual machines other than said driver domain to indicate that the backend is said driver virtual machine.

* * * * *